US012472314B2

(12) United States Patent
Smaldone

(10) Patent No.: US 12,472,314 B2
(45) Date of Patent: *Nov. 18, 2025

(54) BREATH ACTUATED NEBULIZER FOR VENTILATOR CIRCUIT

(71) Applicant: The Research Foundation for The State University Of New York, Albany, NY (US)

(72) Inventor: Gerald Smaldone, Stony Brook, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 1132 days.

This patent is subject to a terminal disclaimer.

(21) Appl. No.: 15/734,677

(22) PCT Filed: Jun. 6, 2019

(86) PCT No.: PCT/US2019/035860
§ 371 (c)(1),
(2) Date: Dec. 3, 2020

(87) PCT Pub. No.: WO2019/236899
PCT Pub. Date: Dec. 12, 2019

(65) Prior Publication Data

US 2021/0236750 A1 Aug. 5, 2021

Related U.S. Application Data

(60) Provisional application No. 62/681,654, filed on Jun. 6, 2018.

(51) Int. Cl.
*A61M 11/00* (2006.01)
*A61M 11/06* (2006.01)
(Continued)

(52) U.S. Cl.
CPC ............ *A61M 11/06* (2013.01); *A61M 11/00* (2013.01); *A61M 15/0095* (2014.02);
(Continued)

(58) Field of Classification Search
CPC .......... A61M 15/0095; A61M 16/0883; A61M 11/00; A61M 11/06; A61M 16/0057;
(Continued)

(56) References Cited

U.S. PATENT DOCUMENTS 5,054,477 A * 10/1991 Terada ............... A61M 16/125 128/200.22
5,119,807 A 6/1992 Roberts et al.
(Continued)

FOREIGN PATENT DOCUMENTS

WO 2009/0123456 A4 12/2016

OTHER PUBLICATIONS

T.G. O'Riordan, G.C. Smaldone, et al., "Nebulizer Function during Mechanical Ventilation," Am Rev Respir Dis. May 1992;145(5):1117-22, https://doi.org/10.1164/ajrccm/145.5.1117, PubMed 1586056.
(Continued)

*Primary Examiner* — Steven O Douglas
(74) *Attorney, Agent, or Firm* — Rivkin Radler LLP

(57) ABSTRACT

A ventilator circuit apparatus is provided for the administration of an aerosolized drug from a nebulizer through an endotracheal tube to a patient on a mechanical ventilator with humidification of the breathing gases. Means to disconnect the nebulizer without interrupting the airflow to the patient is provided, with a T-fitting and three-way valve in the ventilator circuit that permits the nebulizer to be bypassed by the airflow, allowing the nebulizer to be removed from the apparatus without interrupting the flow of breathing gases to the patient. In embodiment, the nebulizer is breath-enhanced jet nebulizer. In an embodiment, the jet
(Continued)

nebulizer is breath-actuated, by the use of an air pressure sensor that toggles the flow of pressurized air to the nebulizer that drives the jet required for nebulization.

6 Claims, 6 Drawing Sheets

(51) Int. Cl.

| | |
|---|---|
| ***A61M 15/00*** | (2006.01) |
| ***A61M 16/00*** | (2006.01) |
| ***A61M 16/04*** | (2006.01) |
| ***A61M 16/08*** | (2006.01) |
| *A61M 16/14* | (2006.01) |
| *A61M 16/20* | (2006.01) |

(52) U.S. Cl.

CPC ........ *A61M 16/0057* (2013.01); *A61M 16/04* (2013.01); *A61M 16/0883* (2014.02); *A61M 2016/0027* (2013.01); *A61M 16/0875* (2013.01); *A61M 16/147* (2014.02); *A61M 16/204* (2014.02); *A61M 2205/3331* (2013.01); *A61M 2206/20* (2013.01)

(58) Field of Classification Search

CPC .. A61M 16/04; A61M 16/0463; A61M 16/14; A61M 16/16; A61M 2016/0027; A61M 2205/3331; A61M 2206/20

See application file for complete search history.

(56) References Cited

U.S. PATENT DOCUMENTS

| | | | | |
|---|---|---|---|---|
| 5,388,571 | A * | 2/1995 | Roberts | A61M 16/16 128/205.12 |
| 7,634,998 | B1 | 12/2009 | Fenley | |
| 10,342,456 | B2 * | 7/2019 | Haveri | A61M 16/14 |
| 2006/0283447 | A1 | 12/2006 | Dhuper et al. | |
| 2007/0083677 | A1 * | 4/2007 | Cecka | A61M 15/0015 710/1 |
| 2007/0157931 | A1 * | 7/2007 | Parker | A61M 11/005 128/204.23 |
| 2014/0053830 | A1 | 2/2014 | Smaldone et al. | |
| 2014/0238397 | A1 | 8/2014 | Buechi et al. | |
| 2015/0108670 | A1 | 4/2015 | Magee | |
| 2016/0250437 | A1 | 9/2016 | Fink et al. | |
| 2024/0075238 | A1 * | 3/2024 | Smaldone | A61M 16/1045 |

OTHER PUBLICATIONS

P. Diot and G.C. Smaldone et al., "Albuterol Delivery in a Model of Mechanical Ventilation," Am J Respir Crit Care Med 1995, 152, 1391-1394, doi: 10.1164/ajrccm.152.4.7551401.

D.D. Miller, G.C. Smaldone et al., "Aerosol Delivery and Modern Mechanical Ventilation, In Vitro/In Vivo Evaluation," Am J Respir Crit Care Med, 2003, 168, 1205-1209, doi: 10.1164/rccm.200210-1167OC.

* cited by examiner

BREATH ACTUATED NEBULIZER FOR VENTILATOR CIRCUIT

CROSS REFERENCE TO RELATED APPLICATIONS

This application is a national stage patent application filed under 35 U.S.C. § 371 of PCT International patent application PCT/US2019/035860, filed Jun. 6, 2019, and claiming priority to U.S. patent application 62/681,654, filed Jun. 6, 2018, the entire contents of each of which are incorporate by reference.

FIELD OF THE INVENTION

This invention pertains to the administration of nebulized drugs to patients connected to a mechanical ventilator breathing circuit.

BACKGROUND

The administration of nebulized drugs to patients on a mechanical ventilator is an important medical need. Challenges in the administration of nebulized drugs to patients on a mechanical ventilator include maximizing efficient delivery of the drug to the lungs of the patient and provision of properly humidified breathing gases. Inefficient drug delivery wastes drug product, which may be expensive, may cause unpredictable dosing to patients (too much or too little drug), and may cause undesirable exposure of drug to surrounding persons. As used herein, the term "nebulized" is also referred to as "atomized" or "aerosolized," and all three terms are interchangeable. The term "drug" as used herein is interchangeable with "pharmaceutical composition."

Prior art approaches to administering nebulized drugs to patients on a ventilator typically involve nebulizers incorporated into a breathing circuit. Among the challenges of the administration of nebulized drugs in a breathing circuit are maintaining appropriate humidification and minimizing the variability in drug delivery to the patient.

Normally, patients on a mechanical ventilator require humidification of the inspired air or other gases. However, the nebulization of many drugs with humidification may be a problem. The humidification can interfere with the formation and transfer of appropriately sized droplets of an atomized drug composition. Thus, in many cases, it is desirable to nebulize a drug composition without humidification.

Another issue is managing the ventilator circuit to minimize interruption to the breathing of the patient. It is typically desirable to remove a nebulizer to refill it or clean it. At the same time, turning off the entire circuit, even momentarily, can be a problem for patients on a mechanical ventilator.

Nebulized aerosol delivery during mechanical ventilation results in profound unregulated aerosol losses, which are a strong function of duty cycle or the inhalation-exhalation (I/E) ratio, bias flow, and humidification. Previous studies have suggested that humidification during nebulization may reduce drug output (T. G. O'Riordan, G. C. Smaldone, et al., "Nebulizer Function during Mechanical Ventilation," Am Rev Respir Dis. 1992 May; 145(5):1117-22, https://doi.org/10.1164/ajrccm/145.5.1117, PubMed 1586056; P. Diot and G. C. Smaldone et al., "Albuterol Delivery in a Model of Mechanical Ventilation," Am J Respir Crit Care Med 1995, 152, 1391-1394, doi: 10.1164/ajrccm. 152.4.7551401; D. D. Miller, G. C. Smaldone et al., "Aerosol Delivery and Modern Mechanical Ventilation, In Vitro/In Vivo Evaluation," Am J Respir Crit Care Med, 2003, 168, 1205-1209, doi: 10.1164/rccm.200210-1167OC (see table 1)).

Ventilation circuits have previously been described in, e.g., US 2014/0238397 A1, published Aug. 24, 2014, and US 2015/0108670 A1, published Apr. 23, 2015.

SUMMARY OF THE INVENTION

The present invention describes a novel ventilator circuit that minimizes the influences of duty cycle or the inhalation-exhalation (I/E) ratio, bias flow, and humidification by utilizing a design that results in aerosol generation primarily during inspiration (breath enhancement) and minimizes expiratory losses (breath-actuation). The circuit facilitates control of supplemental humidification and functions independently of the brand of the ventilator.

Also, in view of the references cited above (O'Riordan, Diot, and Miller), suggesting that humidification during nebulization on breathing circuits with mechanical ventilation may reduce drug output, the instant invention is designed to provide the benefits of dry nebulization, humidification as required, and isolation of the nebulizer for efficient removal without interrupting the breathing.

In a first aspect, a ventilator circuit apparatus is provided for the administration of nebulized drugs through an endotracheal tube to a patient on a mechanical ventilator that controls breathing gases to the patient. The apparatus has a breathing circuit with an inspiratory limb and exhalation limb connected to the ventilator; a nebulizer on the inspiratory limb interposed between a T-fitting and a three-way valve such that the nebulizer can be removed from the inspiratory limb without interrupting the flow of breathing gases to the patient; and a humidifier or heat and moisture exchanger (HME) on the inspiratory limb interposed between the nebulizer and the endotracheal tube. In an embodiment, all breathing gases to the patient flow through the ventilator circuit. In an embodiment, the nebulizer is a jet-nebulizer. In an embodiment, the nebulizer is breath-actuated, further comprising a pressure sensor interposed between the nebulizer and the ventilator, wherein the pressure sensor controls a pressurized air supply to the nebulizer required for nebulization to occur, such that nebulization only occurs during a pressure increase on the inspiratory limb caused by an increase in air pressure from the ventilator to force an inhalation by the patient. In an embodiment, the nebulizer is breath-enhanced.

In another aspect, a ventilator circuit apparatus is provided for the administration of nebulized drugs through an endotracheal tube to a patient on a mechanical ventilator that provides breathing gases for inhalation by the patient. In an embodiment, the apparatus has an inspiratory tube connected to an endotracheal tube intubated into a patient; a ventilator circuit comprising a T-fitting with three connections, wherein a first connection to the T-fitting is connected to the inspiratory tube, wherein a second connection of the T-fitting is connected to the output port of a humidifier, and wherein a third connection of the T-fitting is connected to the output port of a nebulizer; wherein the input port of the nebulizer is connected to a three-way valve, and wherein a second connection of the three-way valve is connected to the input port of the humidifier, and wherein a third connection of the three-way valve is connected to an inspiratory output of the mechanical ventilator; wherein in a first position of the three-way valve, the circuit is open that bypasses the nebulizer and directly connects the inspiratory output of the mechanical ventilator to the humidifier, and in a second position of the 3-way valve, the inspiratory output of the mechanical ventilator bypasses the humidifier and is directed to the nebulizer; wherein in the second position of the three-way valve, a drug solution in the nebulizer is nebulized to deliver nebulized drug to the inspiratory tube wherein the nebulized drug is inhaled by the patient; and wherein in the first position of the three-way valve, humidified breathing gases are delivered to the inspiratory tube. In an embodiment, a temperature sensor is provided on in the inspiratory tube that controls the amount of water vapor produced by the humidifier. In an embodiment, one or two connections to the T-fitting have a spring-loaded self-sealing fitting, permitting a tube inserted in the connection to be pulled out, whereupon the connection to self-seals.

In another aspect, a ventilator circuit apparatus is provided for the administration of nebulized drugs through an endotracheal tube to a patient on a mechanical ventilator that provides breathing gases for inhalation by the patient. In this embodiment, the apparatus has an inspiratory tube in fluid communication with an endotracheal tube intubated into a patient; a ventilator circuit comprising a T-fitting with three connections, wherein a first connection to the T-fitting is connected to the inspiratory tube, wherein a second connection of the T-fitting is connected to a three-way valve, and wherein a third connection of the T-fitting is connected to the output port of a nebulizer; wherein the input port of the nebulizer is connected to the three-way valve, and wherein a third connection of the three-way valve is connected to an inspiratory output of the mechanical ventilator; wherein in a first position of the three-way valve, the circuit is open that bypasses the nebulizer and directly connects the inspiratory output of the mechanical ventilator to the inspiratory tube, and in a second position of the 3-way valve, the inspiratory output of the mechanical ventilator is directed to the nebulizer; and wherein in the second position of the three-way valve, a drug solution in the nebulizer is nebulized to deliver nebulized drug to the inspiratory tube wherein the nebulized drug is inhaled by the patient. In an embodiment, a heat and moisture exchanger (HME) with a bypass mode is on the inspiratory tube such that when the three-way valve is in the first position, the HME delivers humidified breathing gases to the patient, and when the three-way valve is in the second position, the HME is switched to bypass mode.

In another aspect, the ventilator circuit apparatus for the administration of nebulized drugs through an endotracheal tube to a patient on a mechanical ventilator that provides breathing gases for inhalation by the patient. In this embodiment, the apparatus has an inspiratory tube connected to an endotracheal tube intubated into a patient; a ventilator circuit comprising a T-fitting with three connections, wherein a first connection to the T-fitting is connected to the inspiratory tube, wherein a second connection of the T-fitting is connected by a tube to a first connection on a three-way valve, and wherein a third connection of the T-fitting is connected to the output port of a nebulizer; wherein the input port of the nebulizer is connected to a second connection of the three-way valve, and wherein a third connection of the three-way valve is connected to an inspiratory output of the mechanical ventilator; wherein in a first position of the three-way valve, the circuit is open that bypasses the nebulizer and directly connects the inspiratory output of the mechanical ventilator to the inspiratory tube, and in a second position of the 3-way valve, the inspiratory output of the mechanical ventilator is directed to the nebulizer; and wherein in the second position of the three-way valve, a drug solution in the nebulizer is nebulized to deliver nebulized drug to the inspiratory tube wherein the nebulized drug is inhaled by the patient. In an embodiment, a ball-valve is interposed between the T-fitting and the nebulizer. In an embodiment, a ball-valve is interposed between the T-fitting and the nebulizer, and when the three-way valve is in position one and the ball valve is closed, the nebulizer can be removed from the ventilator circuit without interrupting the flow of breathing gases to the patient. In an embodiment, a temperature sensor is provided on in the inspiratory tube that controls the amount of water vapor produced by the humidifier. In an embodiment, the apparatus has an HME.

In another aspect, a method is provided of administering a nebulized drug with any of the apparatus embodiments of this invention.

In embodiments, the present invention uses breath-enhanced nebulizers. In an embodiment, the nebulization may be breath-activated. Prior art breath-enhanced nebulizers have only been used with spontaneously breathing patients. Using a breath-enhanced nebulizer with a mechanical ventilator and a breathing circuit allows further enhances the patient's berating and facilitates the desired drug intake.

The present inventors have found that breath-enhanced nebulizers, such as those disclosed in this invention, can significantly increase the fraction of drug that is inhaled by the patient and delivered to the lungs (as measured by an inhaled mass (IM) filter in a test apparatus). Moreover, the BEN can significantly shorten the time required to nebulize a particular dose of medication, which can be a significant advantage to the care facility.

DETAILED DESCRIPTION

Figure 1:
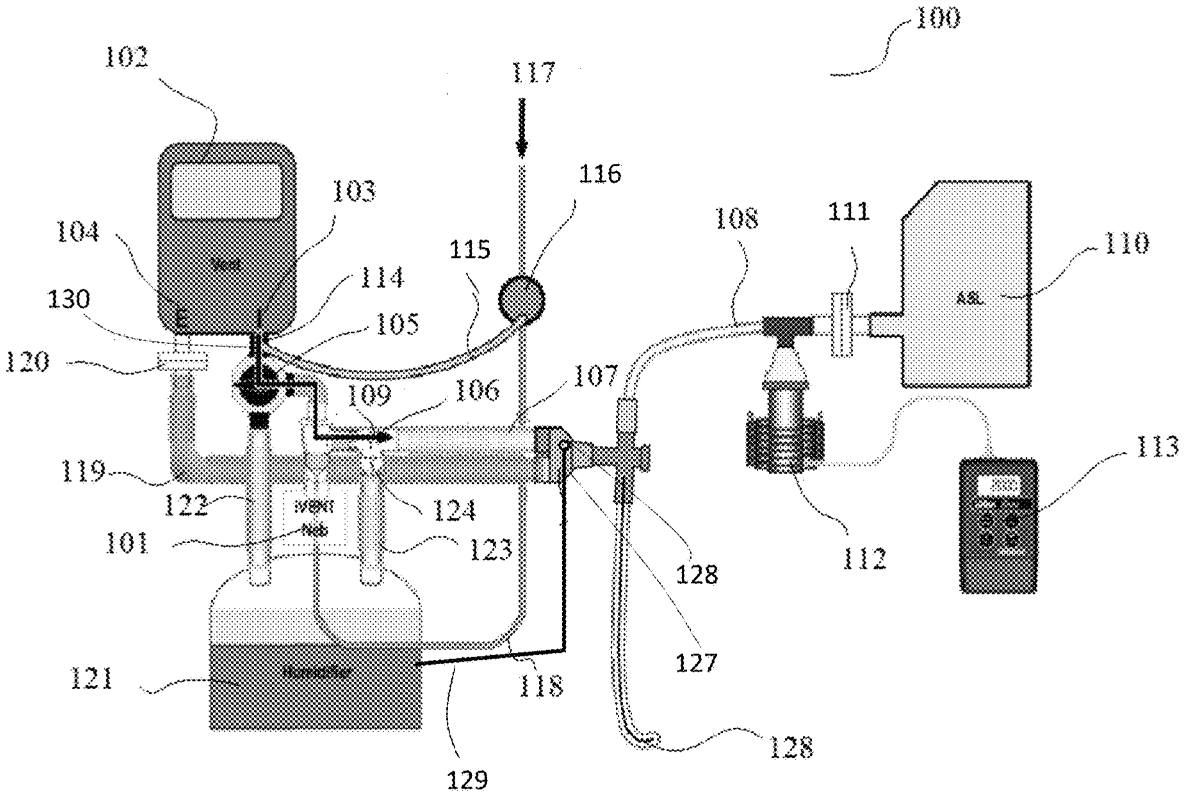
FIG. 1 shows an embodiment of a ventilator circuit of this invention with the inhaled air flow directed to a nebulizer.

Disclosed herein is a breathing circuit for the administration of nebulized drugs to a patient breathing with the aid of a mechanical ventilator and a breathing circuit. In an embodiment, part of the circuit is a nebulizer, which nebulizes a drug solution for inhalation of the drug by a patient.

In an embodiment, the nebulizer is a jet nebulizer that nebulizes drug solutions by shear forces from a compressed air supply to the nebulizer jet. In an embodiment, the nebulizer is another type of nebulizer, for example, a vibrating mesh nebulizer or an ultrasonic nebulizer.

In operation, a three-way valve may be included that has two operating positions. A second position directs all ventilator flow to the nebulizer resulting in an aerosol generation, which may be limited to nebulization during the inhalation portion of a breathing cycle only. In a first operating position of the three-way valve, the breathing gases from the ventilator bypass the ventilator and pass instead either directly to the inspiratory limb of the breathing circuit, or pass to the inspiratory limb through a humidifier. In an embodiment, special connections in the ventilator circuit bypass the nebulizer and allow for nebulizer removal for servicing without breaking the air flow in the circuit or interrupting breathing to the patient.

In an embodiment, the nebulizer used in this invention is a jet-nebulizer and generates aerosol by nebulization only when a nebulizer air flow is provided. An exemplary nebulizer is that disclosed in co-pending patent application [ ], filed [ ], and based on U.S. Provisional Patent Application No. 62/681,654 filed Jun. 6, 2018. As disclosed therein, breath-enhanced and breath-actuated nebulizers are provided.

Breath-enhanced nebulizers have an internal configuration that enhances, or amplifies, the rate of nebulization compared to prior art jet nebulizers. Embodiments of breath-enhanced nebulizers are disclosed in co-pending patent application [ ], based on U.S. Provisional Patent Application No. 62/681,654. Other types of nebulizers may also be useful in this invention, including other jet nebulizer designs, vibrating mesh, and ultrasonic nebulizers that can be used in a breathing circuit controlled by a mechanical ventilator.

In an embodiment, the nebulization is breath actuated. With a breath actuated nebulizer, compressed air is only provided to the nebulizer while the patient is inhaling. This is controlled with a pressure sensor that toggles the nebulizer air flow on or off as required. The inhalation portion of a breathing cycle is also termed the "duty cycle," the fraction of time of an overall inhalation/exhalation cycle when the patient is actually inhaling. In an embodiment, breath-actuation relies on a pressure sensor that can detect when a patient is inhaling, as opposed to exhaling or neither inhaling nor exhaling, and the sensor can activate a solenoid that provides compressed air to the nebulizer. In an embodiment, the pressure sensor is placed on a tube in fluid communication with the inspiratory outlet of the mechanical ventilator. When the ventilator causes the patient to inhale by increasing the air pressure at the inspiratory outlet, the pressure sensor detects this increase and switches on a nebulizer air flow to the nebulizer, which drives the jet nebulizer and causes nebulization to occur. Other means of toggling nebulization are possible with other types of nebulizers. For example, with an electrically driven vibrating mesh or ultrasonic nebulizer, a pressure sensor can control the power supply that drives the nebulization.

In an aspect of this invention, the nebulized drug is provided by the inventive breathing circuits in such a way the humidification is not used during nebulization. This may be a desirable feature based on previous studies (O'Riordan, Diot, and Miller, cited above) suggesting much lower nebulizer efficiency if a humidifier is placed before the nebulizer, so that humidified air or other breathing gases enter the nebulizer. As used herein, the term "breathing gases" means either ordinary air or another breathing gas mixture indicated for use in mechanical ventilation, such as oxygen enriched air.

In an embodiment of this invention, the entire mass of breathing gases in the inspiratory tract passes through the nebulizer when the nebulizer is active.

Figure 2:
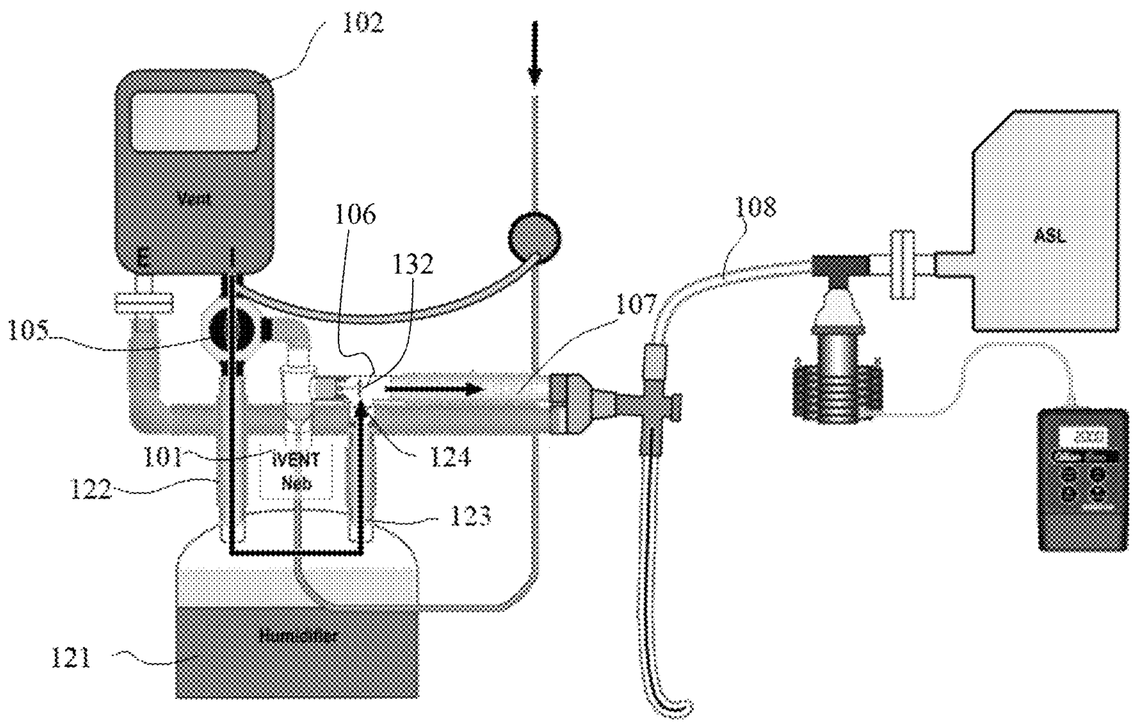
FIG. 2 is a schematic view of the embodiment of the ventilator circuit of FIG. 1, but with the inhaled air flow bypassing the nebulizer and directed through a humidifier.
Figure 3:
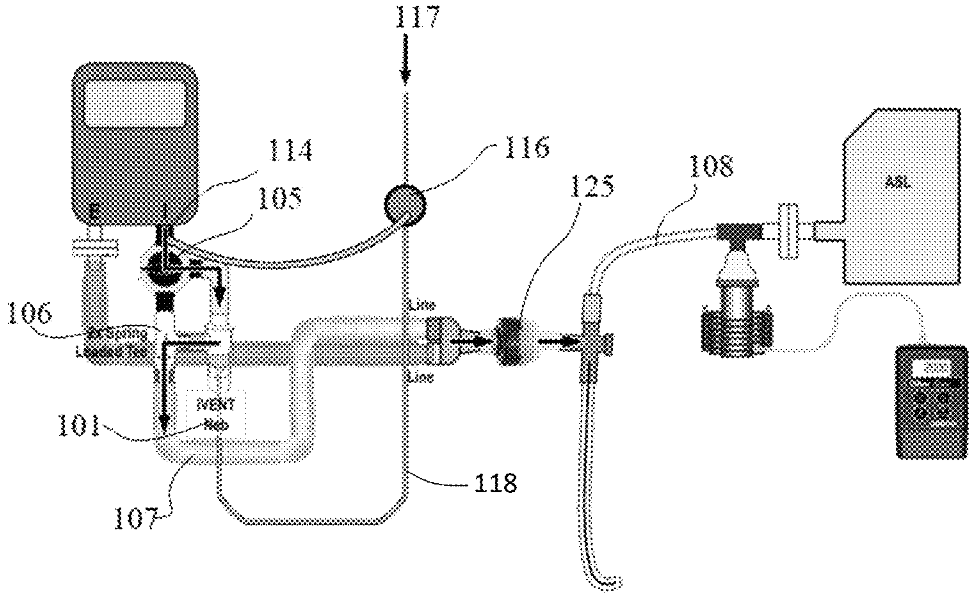
FIG. 3 is a schematic view of an embodiment of a ventilator circuit with the inhaled airflow directed to the nebulizer and passing through a heat and moisture exchanger (HME).

In an embodiment of this invention as shown in FIGS. 1-3, a ventilator circuit apparatus 100 is provided for the administration of nebulized drugs through an endotracheal tube to a patient on a mechanical ventilator 102 that controls breathing gases to the patient. The apparatus has a breathing circuit with an inspiratory limb 107 and exhalation limb 119 connected to the ventilator 102; a nebulizer 101 on the inspiratory limb interposed between a T-fitting and a three-way valve such that the nebulizer can be removed from the inspiratory limb without interrupting the flow of breathing gases to the patient; and a humidifier 121 or heat and moisture exchanger (HME) (125, FIGS. 3-5) on the inspiratory limb interposed between the nebulizer and the breathing tube 108, which in turn is in fluid communication with the endotracheal tube intubated in a patient. In an embodiment, all breathing gases to the patient flow through the ventilator circuit.

In clinical practice, an endotracheal tube would be used by a patient on a ventilator circuit such as disclosed in FIGS. 1-9. The breathing tube 108 would connect to the endotracheal tube. For experimental purposes, a simulated lung 110 may be used, and various measurement devices (111 and 112) may be used (discussed below). An expiratory line (limb) 119 is also attached to the breathing tube 108 through Y-connector 127 conducting the exhaled air to the ventilator expiratory input port 104.

In an embodiment, nebulizer 101, as discussed herein, produces an aerosol (when active) that is shunted through a T-fitting 106 to the inspiratory line 107 and the endotracheal tube 108 positioned downstream of the inspiratory line 107 where it is inhaled by the patient 110.

In an embodiment, the nebulizer 101 is breath-actuated, further comprising a pressure sensor 114 interposed between the nebulizer 101 and the ventilator 102 wherein the pressure sensor controls a pressurized air supply 117 to the nebulizer required for nebulization to occur, such that nebulization only occurs during a pressure increase on the inspiratory limb caused by an increase in air pressure from the ventilator to force an inhalation by the patient. In an embodiment, pressure sensor 114 is in electronic communication with solenoid valve 116 via electrical connection 115 that toggles the supply of compressed air 117 on and off. When the pressure at 114 increases, signaling an inhalation phase of the breathing cycle, pressure sensor 114 activates solenoid 116 to toggle on, supplying compressed air 117 to nebulizer 101 via nebulizer air supply line 118, which causes nebulization to start. When the ventilator reduces the air pressure at port 103, pressure sensor 114 detects that the inhalation phase has stopped, and solenoid valve 116 toggles off stopping the compressed air to nebulizer 101, which stops nebulization. Nebulization will not take place with jet nebulizer 101 unless air supply line 118 is active.

In an embodiment where a jet nebulizer is used, nebulizer compressed air 117 typically at 50 psig is used to drive the jet. Nebulizer flows of 2 L/min in the continuous mode and 3.5 L/min during breath actuation (typical rates; other flow rates are possible) are used with jet nebulizers.

In an embodiment, the nebulizer is breath-enhanced, which is discussed above.

In an embodiment, humidifier 121 supplies properly humidified breathing gases to the patient, ideally at 100% humidity and 37° C. at Y-connector 127. Regulation of the amount of humidity in the circuit is important. With too much humidity, water will tend to condense inside the circuit which is undesirable. With too little humidity, the patient will be uncomfortable and secretions can increase. The humidity may be controlled, at least in part, by temperature sensor 128 in Y-connector 127, that is linked to the humidifier by wire 129. In addition, inspiratory limb 107 may include internal heating elements to heat the breathing gases to an appropriate temperature.

Figure 4:
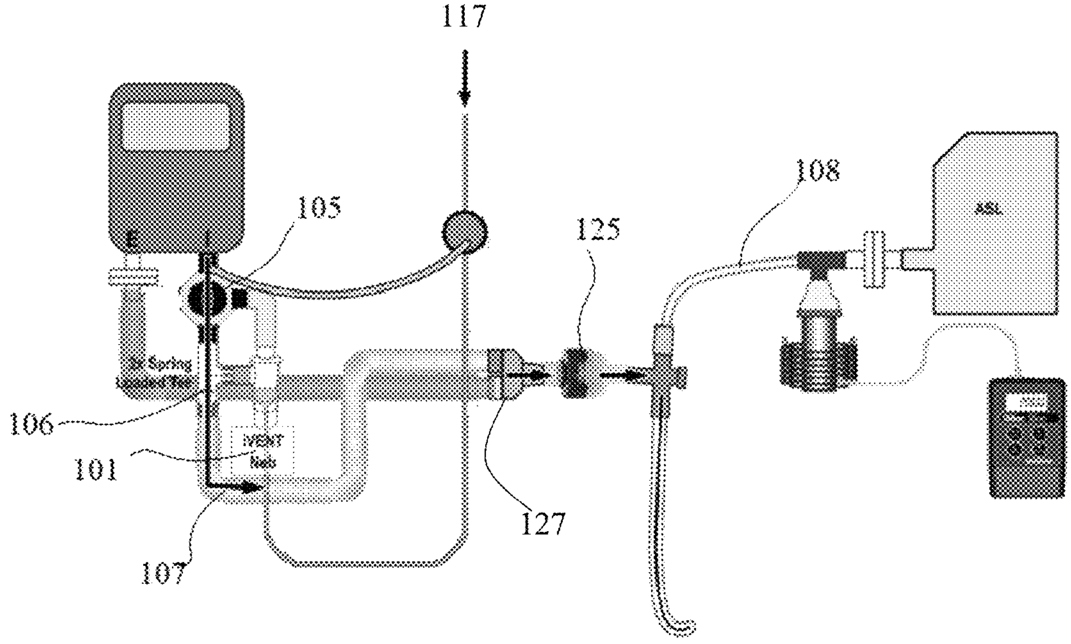
FIG. 4 is a schematic view of the embodiment of the ventilator circuit of FIG. 3 with the inhaled air flow bypassing the nebulizer and passing through an HME.

In an alternative embodiment, instead of a humidifier, a heat and moisture exchanger (HME) 125 may be employed. This is illustrated in FIGS. 3 and 4. The HME is a device capable of recycling moisture from the expiratory air from a patient. In an embodiment, the HME has a bypass mode, in which the humidification feature is turned off and the breathing gases simply pass through. This is necessary when the nebulization is active. When the nebulizer is active, as shown in FIG. 3, the HME would be in bypass mode, since nebulized drug cannot pass through the internal membranes in an HME. Thus, in clinical use, the HME would be active in the gas flow configuration shown in FIG. 4, where the nebulizer is bypassed, to provide humidified breathing gases to the patient. This may be a default mode of operation since the time when a nebulizer is being used (i.e., as shown in FIG. 3) may only be for one or two hours per day.

In the operation of the three-way valve 105, during the inhalation phase of a breathing cycle, breathing gases from the mechanical ventilator inspiratory output port 103 are directed to the three-way valve with a stopcock 105. As shown in FIGS. 1-4, the three-way valve 105 has two modes. In the first mode (termed herein the first position), the three-way valve 105 is configured so that the breathing gases bypass the nebulizer and are shunted through the humidifier 121 (FIG. 2), or directly to an HME 125 in the active mode (FIG. 4). In the other mode of valve 105 (termed herein the second position), the breathing gases are shunted to nebulizer 101 as shown in FIGS. 1 and 3. Nebulization may occur at this stage either in breath-actuated mode or continuous nebulization mode.

In an embodiment, a closed system suction device 128, may be attached to the breathing tube 108 to allow the removal of secretions from the upper respiratory tract without having to open the ventilation circuit.

For studies of the performance of the inventive configuration and/or various nebulizers, an inhaled mass filter (IM filter) 111 and a Cascade impactor 112 attached to the breathing tube 108 can be used to measure the dose of drug delivered to the patient (FIG. 1). A vacuum pump 113 can be attached to the cascade impactor 112. The inhaled mass filter traps nebulized particles where they can be measured either by weight or by e.g., scintillation counting for radiolabeled nebulized material. A cascade impactor measures the droplet size of the aerosol just before reaching the simulated patient. In clinical practice, the IM filter and cascade impactor would not be used.

FIG. 2 shows the same apparatus as provided in FIG. 1, but with the three-way valve 105 in the first position, bypassing the nebulizer 101. In FIG. 2, the inspiratory air flow passes through humidifier 121 via humidifier inlet 122 and outlet 123. The airflow path moves through a T-fitting 106 to the inspiratory line 107 and the breathing tube 108 where it is inhaled by the patient.

In an embodiment, the T-fitting has one or two spring-loaded self-sealing fittings. Such fittings include an internal mechanism opening the airway when a tube is inserted into the fitting. When the tube is removed, a valve closes from the force of a spring, sealing the opening. In an embodiment, a spring-loaded self-sealing fitting 132 is positioned at the T-fitting connection attached to the nebulizer. In an embodiment, another spring-loaded self-sealing fitting 124 is used at the T-fitting connection attached to the humidifier. With these self-sealing fittings, the attachment to the T-fitting 106 can be removed by separating the two parts, or pulling the connection off the T-fitting, whereupon the T-fitting branch self-seals. This arrangement allows for the removal of the nebulizer or humidifier for (but not both) without interruption to the breathing of the patient. Removal of the nebulizer is most important and may be necessary on a routine basis to replenish the drug solution in the nebulizer.

The self-sealing T-fitting can play a critical role in the overall operation of the ventilator circuit embodiments as described herein. It is necessary to periodically remove the nebulizer from the ventilator circuit, for example, to replace it, to clean it, or to refill it. At the same time, a patient on mechanical ventilation is depending on the ventilator and the associated apparatus for their air for their lungs, which ideally is not interrupted, even for a few seconds. Accordingly, disassembling a ventilator circuit can be a problem. Removing a fitting to replace a routine must be done as quickly as possible. By the use of the spring-loaded T-fitting as described here, the nebulizer can be removed from the circuit very easily, with no interruption of air flow, and no break in the ventilator circuit.

Figure 5:
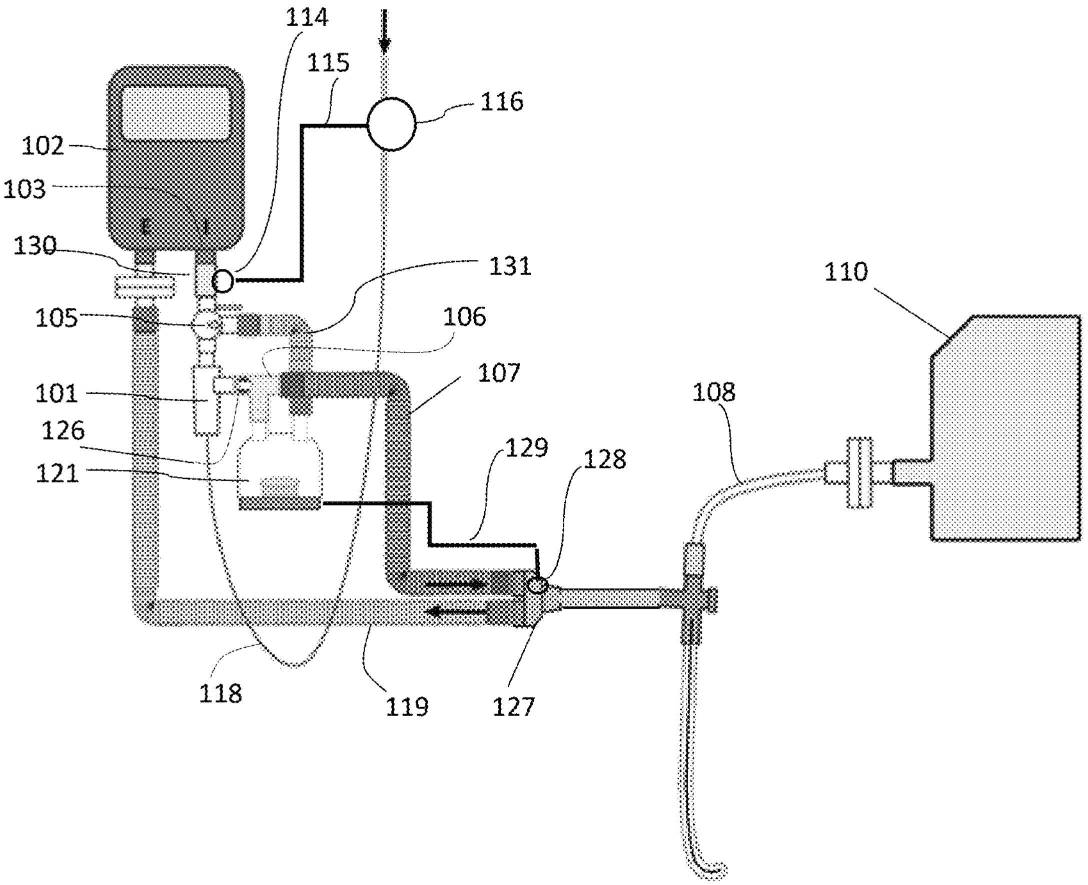
FIG. 5 is a schematic view of an embodiment of a ventilator circuit with a T-fitting and a ball valve.
Figure 6:
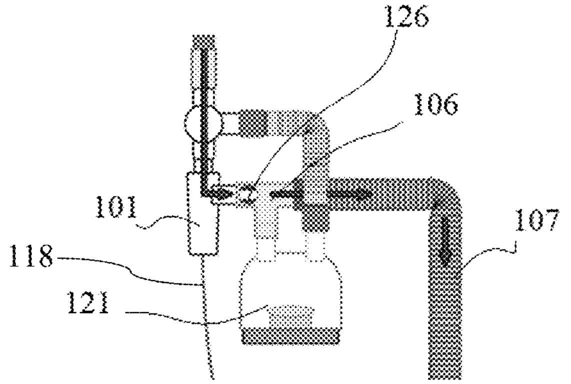
FIG. 6 is a schematic view of a portion of the ventilator circuit of FIG. 5 showing the air flowing through the nebulizer and the ball valve during inhalation while the nebulized drug is being provided by the nebulizer.

An alternative embodiment of the ventilator circuit is shown in FIGS. 5-9, with a different configuration of the humidifier, T-fitting, and three-way valve. In this embodiment, self-sealing connections on the T-fitting are not used. Rather, a ball valve 126 positioned at the exit port of the nebulizer 101 is used instead. As shown in FIG. 6, the nebulization is active. In FIG. 6, the T-fitting is directing the breathing gas flow to the nebulizer, and nebulization can take place when the nebulizer air flow in tube 118 is active. The Ball valve 126 is in the open position and allows breathing gases and nebulized drug to flow from the nebulizer to the inspiratory limb 107, effectively bypassing the humidifier 121.

Figure 7:
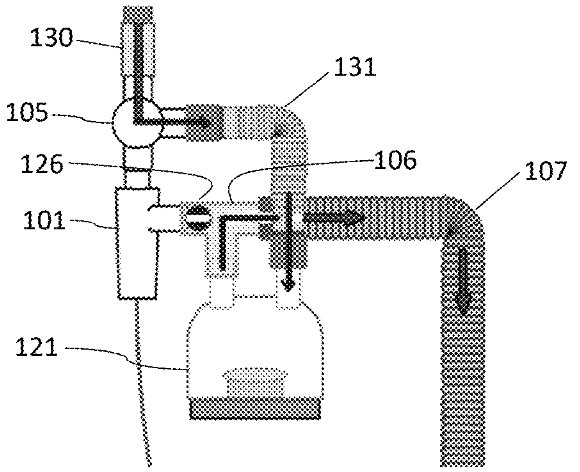
FIG. 7 is a schematic view of a portion of the ventilator circuit of FIG. 5 showing the air flow bypassing nebulizer and passing through the humidifier.

FIG. 7 shows the embodiment of FIG. 5 with the nebulizer bypassed. Three-way valve 105 is in the first position in FIG. 7, directing the breathing gas flow through conduit 131 to humidifier 121. The breathing gas flow exits the humidifier and passes through T-fitting 106 to inspiratory limb 107 and on the patient. In FIG. 7, even though ball valve 126 is open, there is no circuit through nebulizer 101, so it is effectively bypassed.

Figure 8:
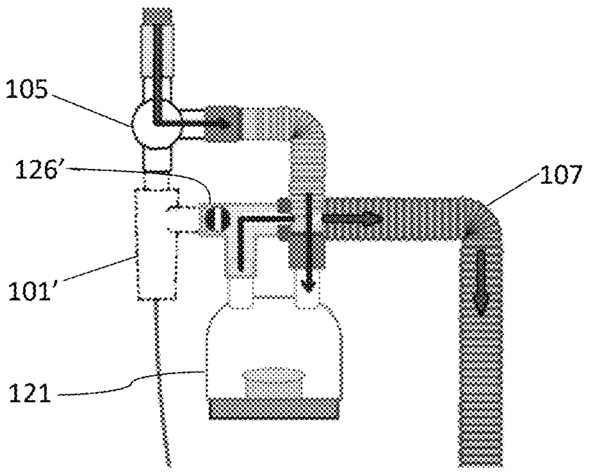
FIG. 8 is a schematic view of a portion of the ventilator circuit of FIG. 5 showing the three-way valve and ball valve configured so that the nebulizer is isolated from the circuit and can be removed without interrupting the circuit.

FIG. 8 shows the embodiment of FIG. 5 wherein the nebulizer is isolated for removal. Three-way valve 105 is in the same position as in FIG. 7, directing the breathing gas to humidifier 121, and then to inspiratory limb 107 where the breathing gas goes to the patient. In FIG. 8, ball valve 126 is in the off position and marked 126', which isolates the nebulizer totally from the circuit. The nebulizer is depicted as 101', in broken lines, indicated it can be safely removed without interrupting the breathing gas circuit.

Figure 9:
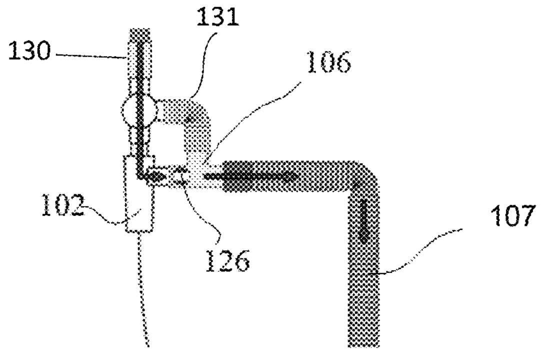
FIG. 9 is a schematic view of the ventilator circuit of FIG. 5 without a humidifier showing the air flow during inhalation. An HME would be used in this embodiment.

FIG. 9 is a portion of a circuit of an embodiment similar to FIG. 5, but with no humidifier. In this embodiment, humidification would be provided with an HME (not shown). As shown in FIG. 9, the three-way valve is in the second position, shunting the breathing gases to the nebulizer. The breathing gases and atomized drug are depicted by the arrows entering inspiratory limb 107, where they would be directed to the patient. Alternatively, when the three-way valve is in the first position, the breathing gases would flow through conduit 131 bypassing the nebulizer. The ball valve can also be turned off, as in FIG. 8, to isolate the nebulizer and allow it to be removed without interrupting the breathing gas circuit.

LEGEND FOR DRAWINGS

100 Ventilator circuit
101 Nebulizer
102 Mechanical ventilator
103 Inspiratory port of the mechanical ventilator
104 Expiratory port of the mechanical ventilator
105 three-way valve (stopcock)
106 T-fitting
107 Inspiratory line
108 Breathing tube
109 Nebulizer spring-loaded tee
110 Patient or simulated lungs
111 IM filter
112 Cascade impactor
113 Vacuum pump
114 Pressure sensor
115 Pressure sensor connection to the solenoid
116 solenoid
117 Compressed air source
118 Compressed air tube
119 Expiratory limb
120 Expiratory filter
121 Humidifier
122 Humidifier inlet
123 Humidifier outlet
124 Humidifier T-fitting valve
125 HME
126 Tee ball valve
127 Y connector
128 Temperature sensor
129 Wire from the temperature sensor to the humidifier
130 Tube from three-way valve to the ventilator
131 Nebulizer bypass tube
132 spring-loaded self-sealing fitting in T-fitting

The invention claimed is:

1. A breath actuated jet nebulizer in a ventilator circuit apparatus for the administration of nebulized drugs through an endotracheal tube to a patient on a mechanical ventilator that provides breathing gases for inhalation by the patient, comprising:

a. A ventilator breathing circuit having a mechanical ventilator and an inspiratory limb and an expiratory limb, with a jet nebulizer on the inspiratory limb, wherein the jet nebulizer requires a pressurized air supply to cause nebulization to occur; and b. A pressure sensor on the inspiratory limb, wherein the pressure sensor is in electronic communication with a solenoid that controls the pressurized air supply to the nebulizer, such that pressurized air is only supplied to the nebulizer when the patient is inhaling.

2. A breath actuated jet nebulizer in a ventilator circuit apparatus for the administration of nebulized drugs through an endotracheal tube to a patient on a mechanical ventilator that provides breathing gases for inhalation by the patient, comprising:

c. A ventilator breathing circuit having a mechanical ventilator and an inspiratory limb and an expiratory limb, with a jet nebulizer on the inspiratory limb, wherein the jet nebulizer requires a pressurized air supply to cause nebulization to occur; and d. A pressure sensor on the inspiratory limb, wherein the pressure sensor is in electronic communication with a solenoid that controls the pressurized air supply to the nebulizer, such that pressurized air is only supplied to the nebulizer during a pressure increase on the inspiratory limb caused by an increase in air pressure from the ventilator to force an inhalation by the patient.

3. The apparatus of claim 2, wherein the pressure sensor is adjacent to the ventilator.

4. A method of administering an inhaled drug to a patient on a mechanical ventilator, comprising a ventilator breathing circuit having a mechanical ventilator and an inspiratory limb and an expiratory limb; wherein a nebulizer and a pressure sensor are provided on the inspiratory limb, wherein the pressure sensor is in electronic communication with a solenoid that controls a pressurized air supply to the nebulizer required for nebulization to occur, such that pressurized air is only supplied to the nebulizer during a portion of the breathing cycle when the patient is inhaling, thereby nebulizing drug that is administered to the patient only when the patient is on an inhalation portion of a breathing cycle.

5. A method of administering an inhaled drug to a patient on a mechanical ventilator, comprising a ventilator breathing circuit having a mechanical ventilator and an inspiratory limb and an expiratory limb; wherein a nebulizer and a pressure sensor are provided on the inspiratory limb, wherein the pressure sensor is in electronic communication with a solenoid that controls a pressurized air supply to the nebulizer required for nebulization to occur, such that pressurized air is only supplied to the nebulizer during a pressure increase on the inspiratory limb caused by an increase in air pressure from the ventilator to force an inhalation by the patient, thereby nebulizing drug that is administered to the patient only when the patient is on an inhalation portion of a breathing cycle.

6. The apparatus of claim 1, wherein the pressure sensor is adjacent to the ventilator.

* * * * *